(12) United States Patent
Oh et al.

(10) Patent No.: US 11,141,953 B2
(45) Date of Patent: Oct. 12, 2021

(54) STEEL SHEET FOR HOT PRESS FORMED MEMBER HAVING EXCELLENT PAINTING ADHESION AND POST-PAINTING CORROSION RESISTANCE

(71) Applicant: POSCO, Pohang-si (KR)

(72) Inventors: Jin-Keun Oh, Gwangyang-si (KR); Seong-Woo Kim, Gwangyang-si (KR); Hyeon-Jeong Shin, Incheon (KR); A-Ra Cho, Incheon (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/617,798

(22) PCT Filed: May 31, 2018

(86) PCT No.: PCT/KR2018/006259
§ 371 (c)(1),
(2) Date: Nov. 27, 2019

(87) PCT Pub. No.: WO2018/221992
PCT Pub. Date: Dec. 6, 2018

(65) Prior Publication Data
US 2020/0101695 A1   Apr. 2, 2020

(30) Foreign Application Priority Data

Jun. 1, 2017 (KR) .................. 10-2017-0068651
Aug. 10, 2017 (KR) .................. 10-2017-0101563

(51) Int. Cl.
*B32B 15/01* (2006.01)
*C22C 38/32* (2006.01)
(Continued)

(52) U.S. Cl.
CPC ............ *B32B 15/012* (2013.01); *B21D 22/02* (2013.01); *B21D 22/022* (2013.01); *B21D 35/00* (2013.01);
(Continued)

(58) Field of Classification Search
CPC ..... B32B 15/012; B32B 15/011; B32B 15/01; B32B 15/013; B32B 15/04; B32B 15/043;
(Continued)

(56) References Cited

U.S. PATENT DOCUMENTS 5,356,724 A * 10/1994 Tsuda ................. C23C 8/10
428/472.2
6,296,805 B1   10/2001 Laurent et al.
(Continued)

FOREIGN PATENT DOCUMENTS

CN      1255272      5/2006
CN    101960034      1/2011
(Continued)

OTHER PUBLICATIONS

Machine Translation, Oh et al., KR 10-1696121, Jan. 2017. (Year: 2017).*
(Continued)

*Primary Examiner* — Michael E. La Villa
(74) *Attorney, Agent, or Firm* — Cantor Colburn LLP

(57) ABSTRACT

Provided is a steel sheet for a hot press formed member having excellent painting adhesion and post-painting corrosion resistance, and a method for manufacturing the same. A steel sheet for hot press forming according to one aspect of the present invention comprises a base steel sheet and a plated layer formed on a surface of the base steel sheet, wherein the ratio of an area occupied by pores to the entire area of a surface layer portion may be 10% or more in a cross
(Continued)

section of the surface layer portion observed when the plated layer is cut in a thickness direction thereof.

5 Claims, 6 Drawing Sheets

(51) Int. Cl.

| | | |
|---|---|---|
| C22C 38/28 | (2006.01) | |
| C22C 38/06 | (2006.01) | |
| C22C 38/04 | (2006.01) | |
| C22C 38/02 | (2006.01) | |
| C22C 38/00 | (2006.01) | |
| C23C 2/12 | (2006.01) | |
| C23C 2/28 | (2006.01) | |
| B21D 22/02 | (2006.01) | |
| C21D 9/46 | (2006.01) | |
| C22F 1/00 | (2006.01) | |
| C22F 1/04 | (2006.01) | |
| C21D 6/00 | (2006.01) | |
| C23C 2/40 | (2006.01) | |
| C23F 17/00 | (2006.01) | |
| B21D 35/00 | (2006.01) | |
| C23C 26/00 | (2006.01) | |
| C23C 28/02 | (2006.01) | |
| C23C 30/00 | (2006.01) | |
| C23C 28/00 | (2006.01) | |
| B32B 15/18 | (2006.01) | |
| C23C 2/04 | (2006.01) | |
| B32B 15/04 | (2006.01) | |
| C23C 2/26 | (2006.01) | |
| C23C 2/06 | (2006.01) | |
| C22C 30/00 | (2006.01) | |
| C22C 38/14 | (2006.01) | |
| C22C 38/48 | (2006.01) | |
| C22C 38/40 | (2006.01) | |
| C22C 38/18 | (2006.01) | |
| C22C 38/42 | (2006.01) | |
| C22C 38/44 | (2006.01) | |
| C22C 38/08 | (2006.01) | |
| C22C 38/16 | (2006.01) | |
| C22C 38/24 | (2006.01) | |
| C22C 21/00 | (2006.01) | |
| C22C 38/38 | (2006.01) | |
| C22C 38/46 | (2006.01) | |
| C22C 38/20 | (2006.01) | |
| C22C 38/26 | (2006.01) | |
| C22C 38/22 | (2006.01) | |
| C22C 38/58 | (2006.01) | |
| C22C 38/12 | (2006.01) | |
| C22C 38/50 | (2006.01) | |
| C22C 38/54 | (2006.01) | |

(52) U.S. Cl.
CPC ............ *B21D 35/005* (2013.01); *B32B 15/01* (2013.01); *B32B 15/011* (2013.01); *B32B 15/013* (2013.01); *B32B 15/04* (2013.01); *B32B 15/043* (2013.01); *B32B 15/18* (2013.01); *C21D 6/005* (2013.01); *C21D 6/008* (2013.01); *C21D 9/46* (2013.01); *C22C 21/00* (2013.01); *C22C 30/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22F 1/002* (2013.01); *C22F 1/04* (2013.01); *C23C 2/04* (2013.01); *C23C 2/06* (2013.01); *C23C 2/12* (2013.01); *C23C 2/26* (2013.01); *C23C 2/28* (2013.01); *C23C 2/40* (2013.01); *C23C 26/00* (2013.01); *C23C 28/023* (2013.01); *C23C 28/321* (2013.01); *C23C 28/322* (2013.01); *C23C 30/00* (2013.01); *C23C 30/005* (2013.01); *C23F 17/00* (2013.01); *Y10T 428/12757* (2015.01); *Y10T 428/12799* (2015.01); *Y10T 428/12958* (2015.01); *Y10T 428/12972* (2015.01); *Y10T 428/12979* (2015.01); *Y10T 428/12993* (2015.01)

(58) Field of Classification Search
CPC ...... B32B 15/18; B21D 35/00; B21D 35/005; B21D 22/022; B21D 22/02; C23C 26/00; C23C 2/40; C23C 2/12; C23C 2/28; C23C 2/04; C23C 2/26; C23C 2/06; C23C 30/00; C23C 30/005; C23C 28/023; C23C 28/321; C23C 28/322; C21D 6/005; C21D 6/008; C21D 9/46; C23F 17/00; C22F 1/04; C22F 1/002; C22C 38/001; C22C 38/002; C22C 38/02; C22C 38/04; C22C 38/06; C22C 38/28; C22C 38/32; C22C 38/08; C22C 38/12; C22C 38/14; C22C 38/16; C22C 38/18; C22C 38/20; C22C 38/22; C22C 38/24; C22C 38/26; C22C 38/38; C22C 38/40; C22C 38/42; C22C 38/44; C22C 38/46; C22C 38/48; C22C 38/50; C22C 38/54; C22C 38/58; C22C 21/00; C22C 30/00; Y10T 428/12757; Y10T 428/12799; Y10T 428/12958; Y10T 428/12972; Y10T 428/12979; Y10T 428/12993
See application file for complete search history.

(56) References Cited

U.S. PATENT DOCUMENTS

| | | |
|---|---|---|
| 2004/0009366 A1 | 1/2004 | Takagi et al. |
| 2011/0008647 A1 | 1/2011 | Azuma et al. |
| 2011/0030441 A1 | 2/2011 | Maki et al. |
| 2011/0174418 A1 | 7/2011 | Maki et al. |
| 2013/0220490 A1 | 8/2013 | Hayashi et al. |
| 2013/0280552 A1 | 10/2013 | Bae et al. |
| 2013/0340899 A1 | 12/2013 | Kusumi et al. |
| 2014/0120366 A1 | 5/2014 | Sohn |
| 2014/0363697 A1 | 12/2014 | Kim et al. |
| 2015/0017474 A1 | 1/2015 | Harako et al. |
| 2015/0044499 A1 | 2/2015 | Maki et al. |
| 2016/0376679 A1 | 12/2016 | Kim et al. |
| 2019/0003029 A1 | 1/2019 | Oh et al. |

FOREIGN PATENT DOCUMENTS

| | | |
|---|---|---|
| CN | 102066615 | 5/2011 |
| CN | 102089451 | 6/2011 |
| CN | 103168106 | 6/2013 |
| CN | 103261466 | 8/2013 |
| CN | 103429774 | 12/2013 |
| CN | 103764866 | 4/2014 |

(56) References Cited

FOREIGN PATENT DOCUMENTS

| CN | 104024464 | | | 9/2014 |
|---|---|---|---|---|
| CN | 104145039 | | | 11/2014 |
| CN | 104220641 | | | 12/2014 |
| EP | 2312005 | | | 4/2011 |
| EP | 2527481 | | | 11/2012 |
| JP | S59056569 | | | 4/1984 |
| JP | H05255890 | | | 10/1993 |
| JP | 09-028582 | A | * | 2/1997 |
| JP | 2003-034854 | A | * | 2/2003 |
| JP | 2003535976 | | | 12/2003 |
| JP | 2004002931 | | | 1/2004 |
| JP | 2004043887 | | | 2/2004 |
| JP | 20040176181 | | | 6/2004 |
| JP | 2009256733 | | | 11/2009 |
| JP | 2011512455 | | | 4/2011 |
| JP | 2011137210 | | | 7/2011 |
| JP | 2012082511 | | | 4/2012 |
| JP | 2013221202 | | | 10/2013 |
| JP | 2016006224 | | | 1/2016 |
| JP | 2019506523 | | | 3/2019 |
| KR | 20100112602 | | | 10/2010 |
| KR | 20110018420 | | | 2/2011 |
| KR | 20150073021 | | | 6/2015 |
| KR | 101536703 | | | 7/2015 |
| KR | 20150075435 | | | 7/2015 |
| KR | 101569505 | | | 11/2015 |
| KR | 101696121 | | | 1/2017 |
| WO | 2001094664 | | | 12/2001 |
| WO | 2009090443 | | | 7/2009 |
| WO | 2010005121 | | | 1/2010 |
| WO | 2018096387 | | | 5/2018 |

OTHER PUBLICATIONS

Machine Translation, Masahiro et al., JP 2003-034854, Feb. 2003. (Year: 2003).*
Machine Translation, Hiroshi et al., JP 09-028582, Feb. 1997. (Year: 1997).*
International Search Report—PCT/KR2018/006259 dated Oct. 2, 2018.
Chinese Office Action—Chinese Application No. 201880035473.1 dated Jun. 18, 2020.
European Search Report—European Application No. 18808695.3 dated May 19, 2020.
European Search Report—European Application No. 18810215.6 dated May 19, 2020.
European Search Report—European Application No. 18810671.0 dated May 26, 2020.
Suehiro, et al., Properties of Aluminum-coated Steels for Hot-forming, Nippon Steel Technical Report, No. 88, Jul. 2003, pp. 16-21.
Chinese Office Action—Chinese Application No. 201880036255.X dated Sep. 1, 2020.
Chinese Office Action—Chinese Application No. 201880036329.X dated Sep. 1, 2020.
Japanese Office Action—Japanese Application No. 2019-565849 dated Dec. 8, 2020.
Japanese Office Action—Japanese Application No. 2019-565854 dated Nov. 24, 2020.
Japanese Office Action—Japanese Application No. 2019-565877 dated Dec. 1, 2020.
Japanese Office Action—Japanese Application No. 2019-565854 dated Aug. 3, 2021, citing KR 10-2015-0075435, Yang, eta!., JP 2004-043887, JP 2011-137210, JP 2004-002931, and KR 10-1696121.
Japanese Office Action—Japanese Application No. 2019-565877 dated Aug. 3, 2021, citing JP 2011 -512455, JP 2016-006224, KR 10-1696121, JP 2009-256733, JP H05-255890, JP 2019-506523, WO 2010/005121, JP 2004-176181, WO 2018/096387, and KR 10-2010-0112602.
Yang, et al., Effect of Nb addition on structure and mechanical properties of FeAl coating, Surface & Coatings Technology, Mar. 2015, vol. 270, pp. 221-226.

* cited by examiner

STEEL SHEET FOR HOT PRESS FORMED MEMBER HAVING EXCELLENT PAINTING ADHESION AND POST-PAINTING CORROSION RESISTANCE

CROSS-REFERENCE TO RELATED APPLICATIONS

This application is a national entry of PCT Application No. PCT/KR2018/006259 filed on May 31, 2018, which claims priority to and the benefit of Korean Application No. 10-2017-0068651 filed on Jun. 1, 2017; and Korean Application No. 10-2017-0101563 filed on Aug. 10, 2017, in the Korean Patent Office, the entire contents of which are incorporated herein by reference.

TECHNICAL FIELD

The present disclosure relates to a steel sheet for a hot press formed member having excellent painting adhesion and post-painting corrosion resistance, and a method for manufacturing the same.

BACKGROUND ART

In recent years, due to depletion of petroleum energy resources and high interest in environmental protection, regulations on improving the fuel efficiency of automobiles are becoming stronger.

In terms of materials, reducing a thickness of a steel sheet used in automobiles is one method for improving the fuel efficiency of automobiles; however, reducing the thickness of a steel sheet may cause problems in the safety of automobiles, such that the strength of the steel sheet should be supported.

Thus, demand for high-strength steel sheets has been continuously generated, and various kinds of steel sheets have been developed. However, since these steel sheets have high strength in themselves, there is a problem that workability thereof is poor. That is, since a product of strength and elongation for each grade of steel sheet tends to always have a constant value, when the strength of the steel sheet increases, there may be a problem that elongation, an index of workability, decreases.

In order to solve this problem, a hot press forming method has been proposed. The hot press forming method is a method of forming a low temperature structure, such as martensite, in a steel sheet by forming at a high temperature suitable for forming and then quenching the steel sheet at a low temperature to increase the strength of the final product. In this case, there is an advantage that the problem of workability may be significantly reduced when manufacturing a member having high strength.

However, according to the above-described hot press forming method, there may be a problem in that a surface of the steel sheet may be oxidized, since the steel sheet needs to be heated to a high temperature, and thus, a process of removing an oxide from the surface of the steel sheet after the press forming should be added.

In order to solve this problem, the disclosure, U.S. Pat. No. 6,296,805 has been proposed. In the above-described disclosure, the steel sheet subjected to aluminum plating is used in a process of hot press forming or heating and quenching after room temperature forming (briefly, post-heat treatment). Since an aluminum plated layer is present on the surface of the steel sheet, the steel sheet is not oxidized at the time of heating.

However, even if the aluminum plated layer is present on the surface thereof such that the steel sheet is not oxidized at the time of heating, a member obtained after heating and forming is still exposed to a corrosive environment. Particularly, in the process of heating the plated steel sheet, base iron diffuses into the aluminum plated layer, and a hard Fe—Al-based plated layer is formed on the surface of the steel sheet. In the case of the Fe—Al-based plated layer, because it is hard and fragile, there is a concern that cracks may occur in the plated layer, and thus the base steel sheet may be exposed to a corrosive environment.

In order to prevent this, the hot press formed member is formed with a painting layer, which is required to have excellent painting adhesion.

DISCLOSURE

Technical Problem

An aspect of the present disclosure is to provide a steel sheet for a hot press formed member having excellent painting adhesion and post-painting corrosion resistance.

Subjects of the present disclosure are not limited to the above issue and it may be understood from an overall content of the present specification, and it will be understood by those skilled in the art that there is no difficulty in understanding additional subjects of the present disclosure.

Technical Solution

According to an aspect of the present disclosure, a steel sheet for a hot press formed member includes a base steel sheet and a plated layer formed on a surface of the base steel sheet. A ratio of an area occupied by pores to an entire area of a surface layer portion may be 10% or more in a cross-section of the surface layer portion observed when the plated layer is cut in a thickness direction thereof.

In an embodiment of the present disclosure, a ratio of an area occupied by pores to an entire area of a surface layer portion may be 15% or more in a cross-section of the surface layer portion observed when the plated layer is cut in a thickness direction thereof.

In an embodiment of the present disclosure, the plated layer may be an aluminum alloy plated layer.

In an embodiment of the present disclosure, the aluminum alloy plated layer may have an average content of Fe of 30% by weight or more.

In an embodiment of the present disclosure, the aluminum plated layer may have an average content of Fe of 40% by weight or more.

In an embodiment of the present disclosure, the base steel sheet may have a composition including, by wt %, carbon (C): 0.04 to 0.5%, silicon (Si): 0.01 to 2%, manganese (Mn): 0.01 to 10%, aluminum (Al): 0.001 to 1.0%, phosphorus (P): 0.05% or less, sulfur (S): 0.02% or less, nitrogen (N): 0.02% or less, and a balance of iron (Fe) and inevitable impurities.

In an embodiment of the present disclosure, the composition of the base steel sheet may further include, by wt %, one or more among, a sum of one or more selected from a group consisting of Cr, Mo and W: 0.01 to 4.0%, a sum of one or more selected from a group consisting of Ti, Nb, Zr and V: 0.001 to 0.4%, Cu+Ni: 0.005 to 2.0%, Sb+Sn: 0.001 to 1.0%, and B: 0.0001 to 0.01%.

According to an aspect of the present disclosure, a manufacturing method of a steel sheet for a hot press formed member having excellent painting adhesion and post-painting corrosion resistance includes operations of: aluminum plating a surface of a base steel sheet and coiling to obtain an aluminum plated steel sheet; annealing the aluminum plated steel sheet to obtain an aluminum alloy plated steel sheet; and cooling the aluminum alloy plated steel sheet. An amount of the aluminum plating is 30 to 200 g/m² based on one side of the steel sheet, and coiling tension is 0.5 to 5 kg/mm² during coiling. The annealing is performed for 30 minutes to 40 hours in a heating temperature range of 550 to 750° C. in a batch annealing furnace. When heating is performed from room temperature to the heating temperature during the annealing, an average temperature increase rate is 20 to 100° C./h, an average temperature increase rate in a section of 400 to 500° C. is 1 to 15° C./h, a temperature increase rate in a section from a heating temperature of −50° C. to a heating temperature is 1 to 15° C./h, a difference between an atmospheric temperature in the batch annealing furnace and a temperature of the steel sheet is 5 to 80° C., and cooling may be performed at a rate of 50° C./h or less to 500° C. in the operation of cooling the aluminum alloy plated steel sheet.

In an embodiment of the present disclosure, the base steel sheet may include a composition, including, by wt %, carbon (C): 0.04 to 0.5%, silicon (Si): 0.01 to 2%, manganese (Mn): 0.01 to 10%, aluminum (Al): 0.001 to 1.0%, phosphorus (P): 0.05% or less, sulfur (S): 0.02% or less, nitrogen (N): 0.02% or less, and a balance of iron (Fe) and inevitable impurities.

In an embodiment of the present disclosure, the composition of the base steel sheet may further include, by wt %, one or more among, a sum of one or more selected from a group consisting of Cr, Mo and W: 0.01 to 4.0%, a sum of one or more selected from a group consisting of Ti, Nb, Zr and V: 0.001 to 0.4%, Cu+Ni: 0.005 to 2.0%, Sb+Sn: 0.001 to 1.0%, and B: 0.0001 to 0.01%.

According to an aspect of the present disclosure, a manufacturing method of a steel sheet for a hot press formed member includes operations of: aluminum plating a surface of a base steel sheet and coiling to obtain an aluminum plated steel sheet; annealing the aluminum plated steel sheet to obtain an aluminum alloy plated steel sheet; and cooling the aluminum alloy plated steel sheet. An amount of the aluminum plating is 30 to 200 g/m² based on one side of the steel sheet, and coiling tension is 0.5 to 5 kg/mm² during coiling. The annealing performed for 30 minutes to 40 hours in a heating temperature range of 550 to 750° C. in a batch annealing furnace. When heating is performed from room temperature to the heating temperature at the time of annealing, an average temperature increase rate is 20 to 100° C./h, an average temperature increase rate in a section of 400 to 500° C. is 1 to 15° C./h, a temperature increase rate in a section from a heating temperature of −50° C. to a heating temperature is 1 to 15° C./h, a difference between an atmospheric temperature in the batch annealing furnace and a temperature of the steel sheet is 5 to 80° C., and cooling may be performed at a rate of 50° C./h or less to 500° C. in the operation of cooling the aluminum alloy plated steel sheet.

In an embodiment of the present disclosure, the base steel sheet may include a composition, including, by wt %, carbon (C): 0.04 to 0.5%, silicon (Si): 0.01 to 2%, manganese (Mn): 0.01 to 10%, aluminum (Al): 0.001 to 1.0%, phosphorus (P): 0.05% or less, sulfur (S): 0.02% or less, nitrogen (N): 0.02% or less, and a balance of iron (Fe) and inevitable impurities.

In an embodiment of the present disclosure, the composition of the base steel sheet may further include, by wt %, one or more among, a sum of one or more selected from a group consisting of Cr, Mo and W: 0.01 to 4.0%, a sum of one or more selected from a group consisting of Ti, Nb, Zr and V: 0.001 to 0.4%, Cu+Ni: 0.005 to 2.0%, Sb+Sn: 0.001 to 1.0%, and B: 0.0001 to 0.01%.

Advantageous Effects

According to one aspect of the present disclosure, since a steel sheet for hot press forming includes pores in a surface layer portion, surface roughness of the member obtained after hot press forming may be greatly increased, resulting in excellent painting adhesion, and as a result, excellent post-painting corrosion resistance may be obtained.

BEST MODE FOR INVENTION

Hereinafter, the present disclosure will be described in detail.

In the present disclosure, a member refers to a component manufactured by hot press forming or a material for the component. In addition, a steel sheet means a steel sheet before hot press forming, and the steel sheet may be wound during a manufacturing process to have a coil form, and in this case, the steel sheet is called as a coil.

Figure 1:
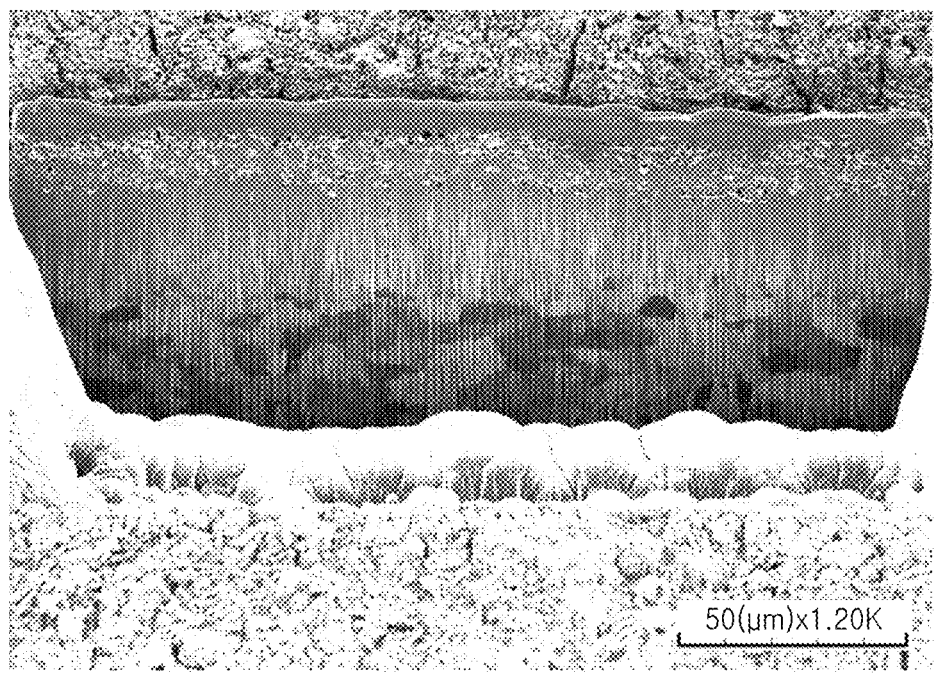
FIG. 1 is a cross-sectional image of a cutting plain of a plated layer of a steel sheet according to an embodiment of the present disclosure.

FIG. 1 is an image by observing a cutting plane of a plated layer of a steel sheet according to an embodiment of the present disclosure. As can be seen in the figure, the steel sheet of the present disclosure is composed of a based steel sheet and a plated layer formed on a surface of the base steel sheet, and has a plurality of pores in a surface layer portion of the plated layer. This is a phenomenon that can not be observed in a conventional aluminum plated steel sheet for hot press forming. In the conventional aluminum plated steel sheet, pores are hardly generated in the surface layer portion by molten aluminum plating, but in the steel sheet according to an embodiment of the present disclosure, a plurality of pores are generated in the surface layer portion of the plated layer. In the present embodiment, the surface layer portion means a region within 10 μm depth from the surface (if the surface layer is rough, the depth is measured from each point of the rough surface).

If a plurality of pores are included in the surface layer portion of the plated layer, when the steel sheet is heated to a high temperature and press-formed, a portion of pores of the surface layer portion are opened by a stress applied during press working, which serves to increase roughness of the surface of the plated layer.

A hot press formed member obtained by hot press forming an aluminum plated steel sheet is subjected to alloying of the surface thereof. Since a resulting obtained alloy layer is relatively stable compared to a non-alloyed aluminum plated layer, reactivity with phosphate is weak, and there is little room for improving painting adhesion only by a common phosphate treatment. Of course, roughness during alloying increases in the hot press forming process, painting adhesion itself may be improved at a certain level, but there is a limitation in the improvement thereof.

Therefore, in the present embodiment, in order to improve this, by forming pores in the plated layer in the steel sheet operation as described above, it contributes to improve the roughness by collapse of the pores in the press forming in the future.

To this end, an area ratio of an area occupied by pores to an overall area of a surface layer portion may be 10% or more in a cross-section of the surface layer portion observed when the plated layer of the steel sheet is cut in a thickness direction thereof, or may be 15% or more. In this case, when the steel sheet is subjected to hot press forming, the surface roughness may be improved, such that painting adhesion and post-painting corrosion resistance may be greatly improved. Although an upper limit of the surface roughness does not need to be particularly limited in terms of paint adhesion or corrosion resistance after painting, a ratio of the pores may be determined to be 70% or less or 60% or less. Although there may be various methods for measuring the ratio of pores, in one embodiment of the present disclosure, a method for measuring a proportion of a portion where the pore exists by using an image analyzer may be used.

In the present disclosure, in order to form a plated layer having a high ratio of pores in the surface layer portion thereof on the surface of the steel sheet, the plated layer may be an aluminum alloy plated layer, and in one embodiment, the plated layer may be an Al—Fe alloy plated layer. According to one embodiment of the present disclosure, the Al—Fe alloy plated layer may be obtained by alloying an Al plated steel sheet under appropriate conditions. That is, in the present embodiment, when the Al plated steel sheet is heated under appropriate conditions, diffusion occurs between Al of the plated layer and Fe of the base steel sheet, and Al and Fe are alloyed, which use a phenomenon in which a plurality of pores are formed in the surface layer portion in the process.

In this case, in order to form pores, an average content of Fe of the plated layer may be 30 wt % or more, more preferably 40 wt % or more, and most preferably 50 wt % or more. That is, since sufficient alloying has to occur to obtain pores in the surface layer portion, an average content of Fe of the plated layer may be 30% wt %, 40% wt %, or 50% wt % or more. An upper limit of the average content of Fe does not need to be particularly determined, but may be set to be 80% wt % or less when considering an efficiency of alloying. Here, the average content of Fe refers to an average Fe content in the entire plated layer, and there may be various measuring methods, but in the present embodiment, the average content of Fe may be used as a value by integrating a Fe content curve according to the depth (thickness) appearing when analyzing the surface of the plated layer and an interface of the steel sheet by a glow discharge emission spectrometry (GDS) method and then dividing it by the thickness of the plated layer. There may be various criteria for determining an interface between the plated layer and the steel sheet, but in the present embodiment, a point at which the Fe content is 92% of a base Fe content from GDS results may be defined as an interface between the plated layer and the steel sheet.

The steel sheet is a steel sheet for hot press forming, and if used for hot press forming, a composition thereof is not particularly limited. However, according to one aspect of the present disclosure, by wt % (hereinafter, unless noted otherwise, it is necessary to note that the composition of the steel sheet and the plated layer is based on weight), the steel sheet and the plated layer of the present disclosure may have the composition including, by wt %, C: 0.04 to 0.5%, Si: 0.01 to 2%, Mn: 0.01 to 10%, Al: 0.001 to 1.0%, P: 0.05% or less, S: 0.02% or less, and N: 0.02% or less.

C: 0.04 to 0.5%

C may be added in an appropriate amount as an essential element for increasing the strength of a heat treatment member. That is, in order to secure sufficient strength in the heat treatment member, the C may be added in an amount of 0.04% or more. In one embodiment, a lower limit of the C content may be 0.1%. However, if the content thereof is too high, in the case of manufacturing a cold rolled material, when the hot rolled material is cold-rolled, the strength of a hot rolled material is so high that cold rollability is greatly inferior, and spot weldability is also greatly reduced. Thus, C may be added in an amount of 0.5% or less to secure sufficient cold rollability and spot weldability. In addition, the C content may be limited to 0.45% or less or 0.4% or less.

Si: 0.01 to 2%

Si not only needs to be added as a deoxidizer in steelmaking, but also suppresses the formation of a carbide which most affects the strength of the member for hot press forming, and in the hot press forming, Si serves to secure residual austenite by concentrating carbon to the grain boundaries of martensite lath after forming martensite. Therefore, Si may be added in an amount of 0.01% or more. In addition, when aluminum plating is performed on the steel sheet after rolling, an upper limit may be set to be 2% in order to secure sufficient plating properties. In one embodiment of the present disclosure, the Si content may be limited to 1.5% or less.

Mn: 0.01 to 10%

Mn may be added in an amount of 0.01% or more in order to secure a solid solution strengthening effect and to lower a critical cooling rate for securing martensite in the member for hot press forming. In addition, the Mn content may be 10% or less in terms of securing workability of the hot press forming process by appropriately maintaining the strength of the steel sheet, reducing manufacturing costs, and improving spot weldability, and in one embodiment of the present disclosure, Mn may be included in an amount of 9% or less, or 8% or less.

Al: 0.001 to 1.0%

Al may be added in an amount of 0.001% or more since Al deoxidizes in steelmaking, together with Si, to increase cleanliness of steel, Al may be added in an amount of 0.001% or more. In addition, the content of Al may be 1.0% or less in order to prevent an Ac3 temperature from becoming too high so that heating required during hot press forming may be performed in an appropriate temperature range.

P: 0.05% or Less

P is present as an impurity in steel, and the smaller the content thereof is, the more advantageous. Therefore, in one embodiment of the present disclosure, P may be included in an amount of 0.05% or less. In another embodiment of the present disclosure, P may be limited to 0.03% or less. Since less P is an advantageous impurity element, there is no need to particularly set an upper limit of the content thereof. However, in order to excessively lower the P content, there is a possibility that manufacturing costs may increase, and in consideration thereof, a lower limit thereof may be set to be 0.001%.

S: 0.02% or Less

S is an impurity in steel, and the maximum content is 0.02% (preferably 0.01% or less) since S is an element that deteriorates ductility, impact characteristics, and weldability of a member. In addition, since manufacturing costs may increase when a minimum content thereof is less than 0.0001%, in one embodiment of the present disclosure, a lower limit of the content thereof may be 0.0001%.

N: 0.02% or Less

N is an element included as an impurity in steel, and in order to reduce sensitivity for crack generation during slab continuous casting, and to secure impact characteristics, the lower the content is, the more advantageous, and thus, N may be included in an amount of 0.02% or less. Although a lower limit does not need to particularly determined, the N content may be set to be 0.001% or more in one embodiment of in consideration of an increase in manufacturing costs, or the like.

In the present disclosure, if necessary, in addition to the above-described steel composition, one or more of a sum of one or more selected from a group consisting of Cr, Mo, and W: 0.01 to 4.0%, a sum of one or more selected from a group consisting of Ti, Nb, Zr and V: 0.001 to 0.4%, Cu+Ni: 0.005 to 2.0%, Sb+Sn: 0.001 to 1.0%, and B: 0.0001 to 0.01% may further be added.

A sum of One or More Selected from a Group Consisting of Cr, Mo and W: 0.01% to 4.0%

Cr, Mo, and W may improve hardenability and secure grain refinement and the strength through a precipitation strengthening effect, such that one or more these may be added in an amount of 0.01% or more, based on the total content. In addition, in order to secure weldability of the member, the content thereof may be limited to 4.0% or less. In addition, when the content of these elements exceeds 4.0%, a further increase in an effect is also not great, so when the content thereof is limited to 4.0% or less, it is also possible to prevent an increase in costs due to the addition of additional elements.

A Sum of One or More Selected from a Group Consisting of Ti, Nb, Zr and V: 0.001 to 0.4%

Ti, Nb, and V are effective in improving the steel sheet of the heat treatment member by forming fine precipitates, and in stabilizing retained austenite and improving impact toughness by grain refinement, such that it (they) may be added in an amount of 0.001% or more of one or more based on the total content. However, if an added amount exceeds 0.4%, an effect thereof is not only saturated, but also an increase in costs by the addition of excessive ferroalloy may be caused.

Cu+Ni: 0.005 to 2.0%

Cu and Ni are elements forming fine precipitates to improve strength. In order to obtain the above-described effects, a sum of one or more these elements may be 0.005% or more. However, if the value exceeds 2.0%, a cost increases excessively, so an upper limit thereof is 2.0%.

Sb+Sn: 0.001 to 1.0%,

Sb and Sn may be concentrated on a surface during an annealing heat treatment for Al—Si plating to suppress the formation of a Si or Mn oxide on the surface to improve plating properties. Sb and Sn may be added in an amount of 0.001% or more in order to obtain such an effect. However, if an added amount exceeds 1.0%, since besides an excessive ferroalloy cost, solid solution at slab grain boundaries may cause coil edge cracks during hot rolling, an upper limit is 1.0%.

B: 0.0001 to 0.01%

B is an element that can not only improve hardenability but also be segregated in an old austenite grain boundary, and suppress brittleness of the member for hot forming due to grain boundary segregation of P or/and S by addition of a small amount. Therefore, B may be added in an amount of 0.001% or more. However, if a content exceeds 0.01%, the effect is not only saturated, but also causes brittleness in hot rolling, so an upper limit thereof may be 0.01%, and in one embodiment, the content of B may be 0.005% or less.

Iron and inevitable impurities may be mentioned as a remainder other than the above-mentioned elements, and the element that can be included in the steel sheet for hot forming is not particularly limited.

Hereinafter an example of manufacturing method of steel for hot press forming is disclosed. However, a method of manufacturing a steel sheet for hot press forming described below is a mere example and it does not mean that the steel sheet for hot press forming of the present disclosure should be manufactured by the present manufacturing method, and it is to be noted that any manufacturing method meets the claims of the present disclosure and there is no problem in implementing each embodiment of the present disclosure.

The steel sheet of the present disclosure may be obtained by using a hot-rolled or a cold-rolled steel sheet, by performing molten aluminum plating on the surface of the base steel sheet, and performing an annealing treatment on the plated steel sheet.

[Aluminum Plating Process]

In an embodiment of the present disclosure, a process of preparing a base steel sheet, aluminum plating a surface of the base steel sheet under appropriate conditions and coiling is performed to obtain an aluminum plated steel sheet (coil).

Aluminum Plating of the Surface of the Base Steel Sheet in a Plating Amount of 30 to 200 $g/m^2$ Per Side An aluminum plating treatment may be performed on a surface of the rolled steel sheet. Aluminum plating may usually include AlSi plating (which may contain 80% or more of Al and 5 to 20% of Si, and additional elements as required), named as a type I, and any plating containing 90% or more of Al and additional elements as required, named as a type II. Hot dip aluminum plating may be performed to form a plated layer, and an annealing treatment may be performed on the steel sheet before plating. A suitable plating amount when plating is 30 to 200 $g/m^2$ based on one side. If the plating amount is too large, it may take an excessive time to alloy to the surface, on the contrary, if the plating amount is too small, it may be difficult to obtain sufficient corrosion resistance.

Coiling Tension After Plating is Set to Be 0.5 to ~5 kg/mm²

When a coil is obtained by coiling the steel sheet after plating, coiling tension of the coil may be adjusted. According to the adjustment of the coiling tension of the coil, an alloying behavior and a surface quality of the coil may be changed during a subsequent annealing treatment.

[Annealing Treatment]

An aluminum plated steel sheet obtained by the above-described process is subjected to annealing under the following conditions to obtain an aluminum alloy plated steel sheet.

Performing Annealing for 30 Minutes to 50 Hours in a Range of 550 to 750° C. in a Batch Annealing Furnace An aluminum plated steel sheet (coil) is heated in a batch annealing furnace. When heating the steel sheet, it is desirable that a heat treatment target temperature and a holding time be maintained for 30 minutes to 50 hours in a range of 550 to 750° C. based on a temperature of the steel sheet (in the present disclosure, a highest temperature at which a material reaches in this temperature range is called as a heating temperature). Here, the holding time is the time after a coil temperature reaches a target temperature until the start of cooling. In one embodiment of the present disclosure, when alloying is not sufficiently performed, a plated layer may be peeled off during roll leveling, such that a heating temperature may be 550° C. or higher for sufficient alloying. In addition, the heating temperature may be 750° C. or less in order to prevent excessive generation of oxides on a surface layer and to secure spot weldability. In addition, in order to sufficiently secure the plated layer and prevent a decrease in productivity, the holding time may be set to be 30 minutes to 50 hours. In one embodiment of the present disclosure, a temperature of the steel sheet may have a pattern in which the temperature continues to rise without a cooling process until a heating temperature is reached.

Heating to a Heating Temperature with an Average Time Increase Rate of 20 to 100° C./h When heating the steel sheet at the above-described heating temperature, in order to secure sufficient productivity and to uniformly alloy the plated layer on all steel sheets (coils), the average temperature increase rate may be 20 to 100° C./h based on the steel sheet (coil) temperature for an entire temperature section (a section from room temperature to a heating temperature). In addition, an overall average temperature increase rate may be controlled in the above numerical range, but in one embodiment of the present disclosure, as described later, a temperature increase rate of a specific temperature section may be also controlled to achieve the object of the present disclosure. In another embodiment of the present disclosure, the average temperature increase rate of the entire temperature section may be set to be 70° C./h.

Heating at an Average Temperature Increase Rate of 1 to 15° C./h in a Section of 400 to 500° C. at the Time of Temperature Increase In one embodiment of the present disclosure, in order to secure sufficient productivity while preventing rolling oil remaining in the temperature range in which the rolling oil mixed during rolling is vaporized to cause surface stains, it may be heated at the average temperature increase rate of 1 to 15° C./h in the section of 400 to 500° C. at the time of temperature increase. In one embodiment of the present disclosure, a lower limit of the average temperature increase rate in the section of 400 to 500° C. at the time of the temperature increase may be 4° C./hr, and in another embodiment, a lower limit of the average temperature increase rate in the section of 400 to 500° C. at the time of the temperature increase may be also 5° C./hr.

Heating at an Average Temperature Increase Rate of 1 to 15° C./h in a Section from the Heating Temperature −50° C. to the Heating Temperature In order to secure sufficient productivity while preventing sticking during alloying (surface defects where the surfaces of the coils are alloyed and stuck) and allowing sufficient pores to form, heating at an average temperature increase rate of 1 to 15° C./h in a section from a heating temperature of −50° C. to a heating temperature during temperature increase may be performed. In one embodiment of the present disclosure, a lower limit of the average temperature increase rate in the section may be set to be 4° C./h, and in another embodiment, a lower limit of the average temperature increase rate of the section may be set to be 5° C./h.

A Difference Between an Atmospheric Temperature and a Temperature of the Steel Sheet in a Batch Annealing Furnace is 5 to 80° C.

In general, heating of the batch annealing furnace uses a method of heating the steel sheet (coil) by increasing the atmosphere temperature in the annealing furnace, rather than a method of directly heating the steel sheet (coil). In this case, the difference between the atmosphere temperature and the temperature of the steel sheet may not be avoided. However, the difference between the atmosphere temperature and the coil temperature may be 80° C. or less based on a time point at which the heat treatment target temperature is reached in order to significantly reduce variations in materials and plating quality for each position in the steel sheet. It is ideal that the temperature difference should be as small as possible, but since this slow down the temperature increase rate, and thus it may be difficult to meet the overall average temperature increase rate, the temperature difference may be 5° C. or more in consideration thereof. Here the temperature of the steel sheet means a temperature measured in a bottom part of the charged steel sheet (coil) (meaning the lowest portion of the coil), and the atmosphere temperature means a temperature measured at a center of the internal space of the heating furnace.

[Cooling Process]

After Annealing, Cooling at a Rate of 50° C./h to 500° C.

After maintaining the target temperature for a certain time, the aluminum alloy plated steel sheet (coil) is cooled. As a cooling method, various methods such as furnace cooling, air cooling, water cooling, and the like may be applied. There is no particular limitation on the average cooling rate of the entire cooling section, and it may be rapidly cooled to improve productivity. However, in order to prevent sticking defects and secure material uniformity and to form pores sufficiently, the cooling rate of the temperature section to 500° C. after heating may be 50° C./h or less. A lower limit is not particularly limited, but may be 1° C./h or more in consideration of productivity.

BEST MODE FOR INVENTION

Hereinafter, the present disclosure will be described more specifically through embodiments. It should be noted, however, that the following embodiments are intended to illustrate the present disclosure in more detail and not to limit the scope of the present disclosure. The scope of the present disclosure is determined by the matters set forth in the claims and the matters reasonably inferred therefrom.

EXAMPLE

Manufacturing a Steel Sheet

Inventive Example 1

A cold-rolled steel sheet for hot press forming having the composition of Table 1 below was prepared. A surface of the steel sheet was plated with a type 1 plating bath having an Al-9% Si-2.5% Fe composition. During plating, the amount of plating was adjusted to 70 g/m² per side, and a coil was wound by adjusting coiling tension after plating to 2.2 kg/mm².

TABLE 1

| Element | | | | | | | |
|---|---|---|---|---|---|---|---|
| C | Si | Mn | Al | P | S | N | Additional element |
| Content (%) 0.21 | 0.2 | 1.3 | 0.03 | 0.01 | 0.003 | 0.005 | Ti 0.03, B 0.002, Cr 0.2 |

The plated steel sheet was heated to 650° C., under the following conditions in a batch annealing furnace.

An overall average temperature increase rate to 650° C.: 20° C./h

An average temperature increase rate in a temperature section of 400 to 500° C.: 10° C./h An average temperature increase rate in a temperature section of 600 to 650° C.: 10° C./h A temperature difference between an atmosphere and a coil at a heating temperature: 30° C.

After heating, the plated steel sheet was maintained at the same temperature for 10 hours, and the steel sheet was then cooled at an average cooling rate of 40° C./h to 550° C., and then cooled at an average cooling rate of 55° C./h to 100° C. to obtain a steel sheet for hot press forming.

Figure 2:
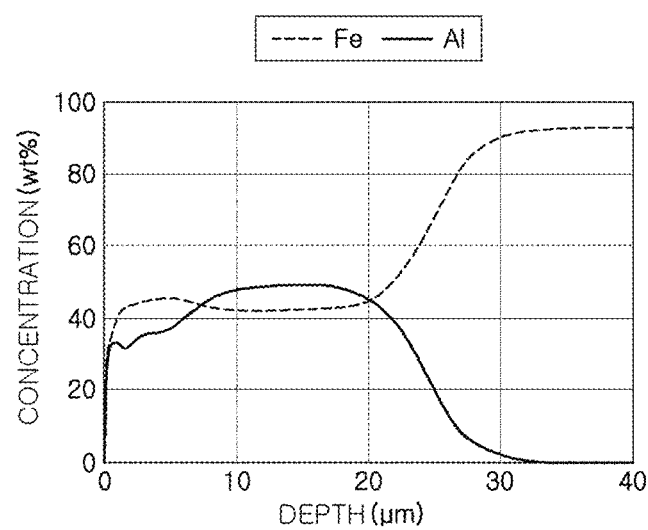
FIG. 2 is a composition profile obtained by analyzing the plated layer of the steel sheet manufactured according to Inventive Example 1 using a GDS analyzer.
Figure 3:
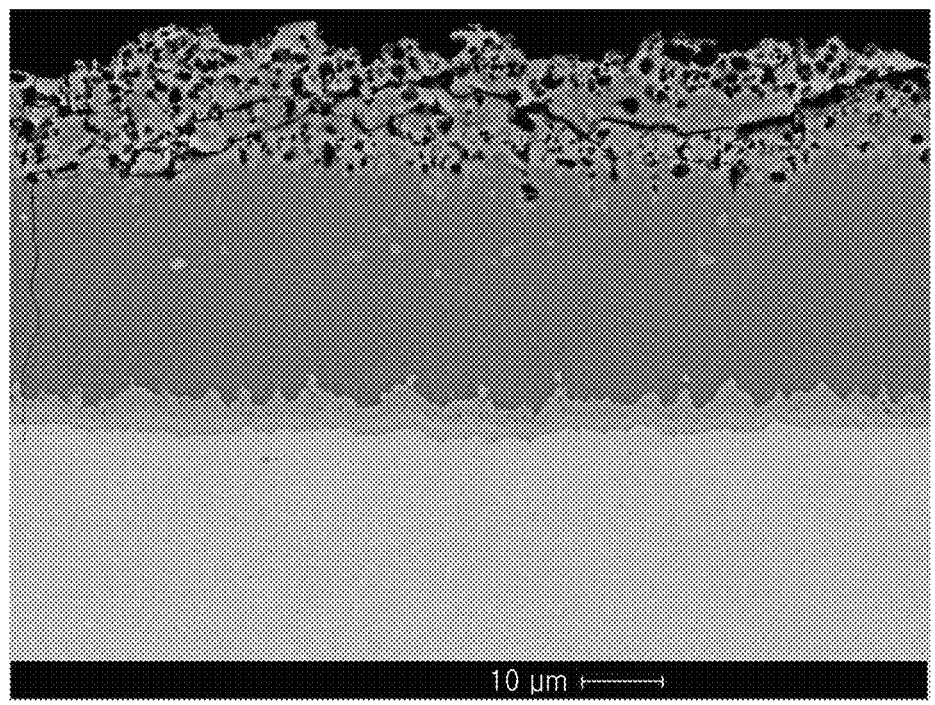
FIG. 3 is a scanning electron image (backscattered electron image) of a cross-section of the plated layer of the steel sheet manufactured by Inventive Example 1 taken by a scanning electron microscope.

As a result of analyzing the plated layer of the steel sheet using a GDS analyzer, a composition profile having a form shown in FIG. 2 could be obtained, and an average Fe content calculated based on this was 51.5 wt %. A cross-sectional form of the steel sheet, as shown in FIG. 3, was formed with a plated layer formed on an outer surface of a base steel sheet, and it can be confirmed that an area ratio of pores formed in a portion corresponding to a surface layer portion from the surface of the formed plated layer to a point of 10 μm in a thickness direction was 22.8%.

Inventive Example 2

A surface of the steel sheet having the composition shown in Table 1 above was plated with a type I plating bath having an Al-9% Si-2.5% Fe composition. During plating, an amount of plating was adjusted to 80 g/m² per side, and a coil was wound by adjusting the coiling tension after plating to 2 kg/mm².

The plated steel sheet was then heated to 700° C. under the following conditions in a batch annealing furnace.

An overall average temperature increase rate to 700° C.: 20° C./h

An average temperature increase rate in a temperature section of 400 to 500° C.: 12° C./h An average temperature increase rate in a temperature section of 650 to 700° C.: 8° C./h A temperature difference between an atmosphere and a coil at a heating temperature: 40° C.

After heating, the plated steel sheet was maintained at the same temperature for 1 hour, and the steel sheet was then cooled at an average cooling rate of 30° C./h to 500° C., and then cooled at an average cooling rate of 57° C./h to 100° C. to obtain a steel sheet for hot press forming.

Figure 4:
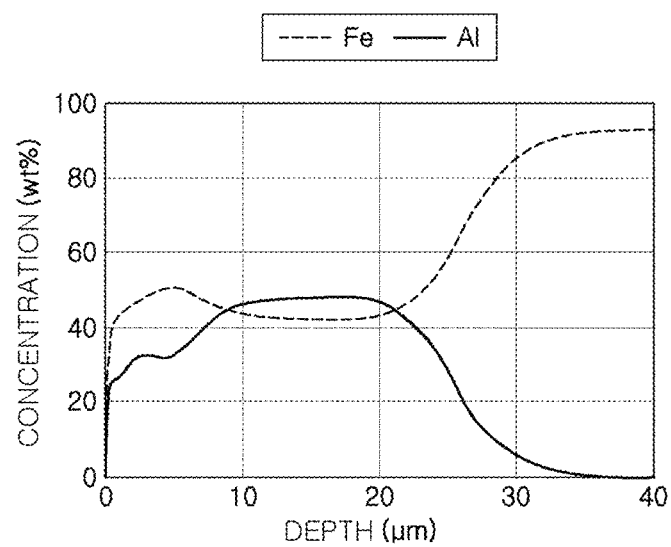
FIG. 4 is a composition profile obtained by analyzing a plated layer of a steel sheet manufactured according to Inventive Example 2 using a GDS analyzer.
Figure 5:
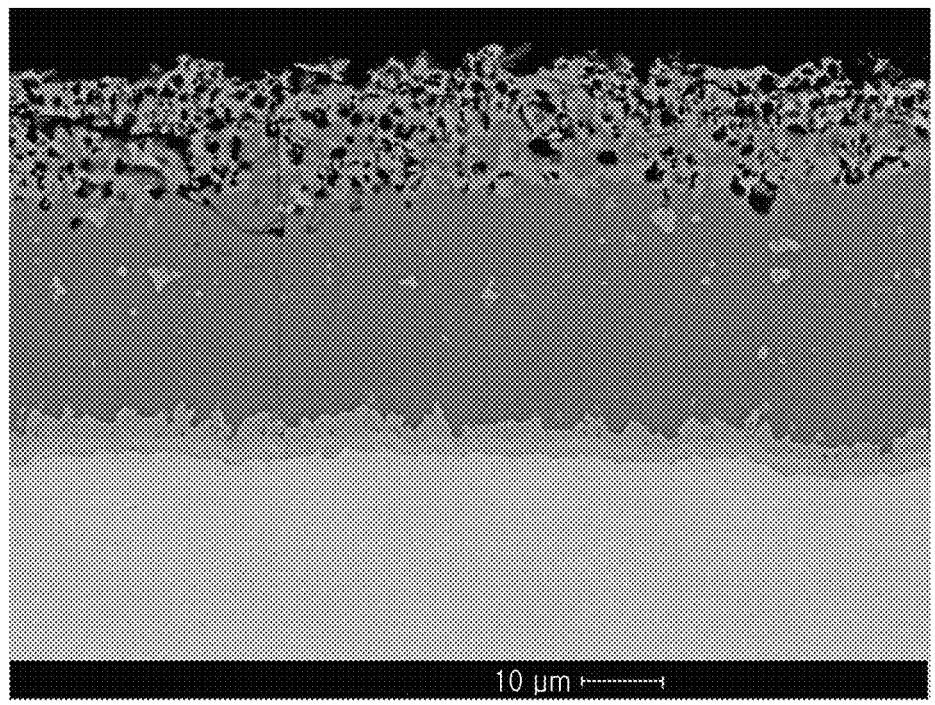
FIG. 5 is a scanning electron image (backscattered electron image) of a cross-section of the plated layer of the steel sheet manufactured by Inventive Example 2 taken by a scanning electron microscope.

As a result of analyzing the plated layer of the steel sheet using a GDS analyzer, a composition profile of the form as shown in FIG. 4 could be obtained, and the average Fe content calculated based on this was 53.7 wt %. A cross-sectional form of the steel sheet, as shown in FIG. 5, was formed with a plated layer formed on an outer surface of a base steel sheet, and it can be confirmed that an area ratio of pores formed in a portion corresponding to a surface layer portion from the surface of the formed plated layer to a point of 10 μm in a thickness direction was 28.5%.

Comparative Example 1

An aluminum plated steel sheet subjected to plating with the same condition as that of Inventive Example 1 only but not heating and cooling was Comparative Example 1.

Figure 6:
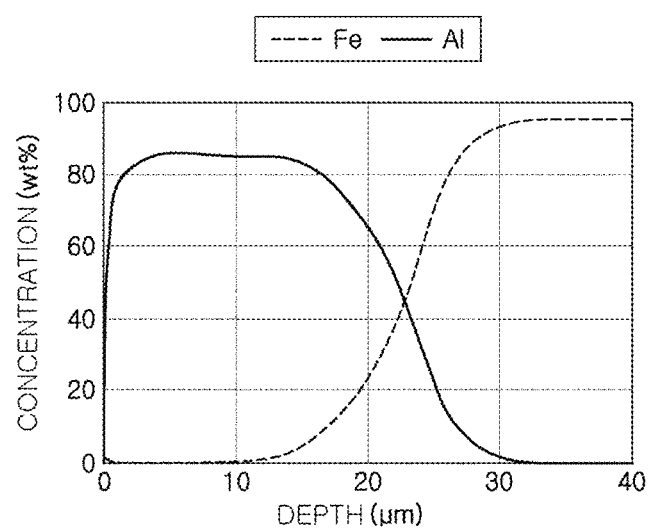
FIG. 6 is a composition profile obtained by analyzing a plated layer of a steel sheet manufactured according to Comparative Example 1 using a GDS analyzer.
Figure 7:
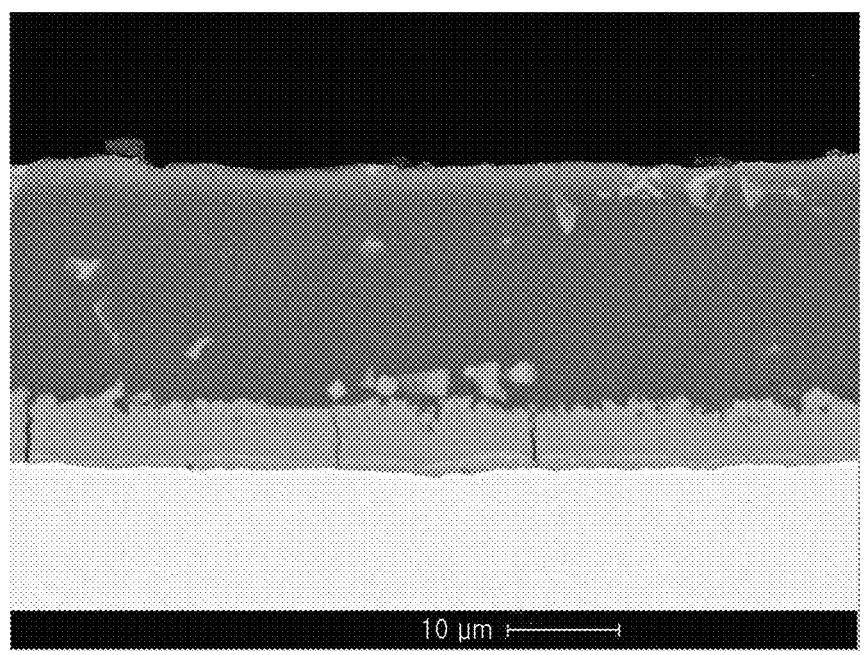
FIG. 7 is a scanning electron image of a cross-section of the plated layer of the steel sheet manufactured by Comparative Example 1 taken by a scanning electron microscope.

As a result of analyzing a plated layer of the steel sheet using a GDS analyzer, a composition profile having a form shown in FIG. 6 could be obtained, and an average Fe content calculated based on this was 23.6 wt %. As shown in FIG. 7, it can be confirmed that a cross-sectional form of the steel sheet had a plated layer formed on an outer surface of the base steel sheet, and almost no pores were formed in a portion corresponding to a surface layer portion from the surface of the formed plated layer to a point of 10 μm in the thickness direction thereof. An area ratio of the formed pores was 0%.

Comparative Example 2

An aluminum plated steel sheet, which is subjected to plating with the same condition as that of Inventive Example 2 only but not heating and cooling was Comparative Example 2.

Figure 8:
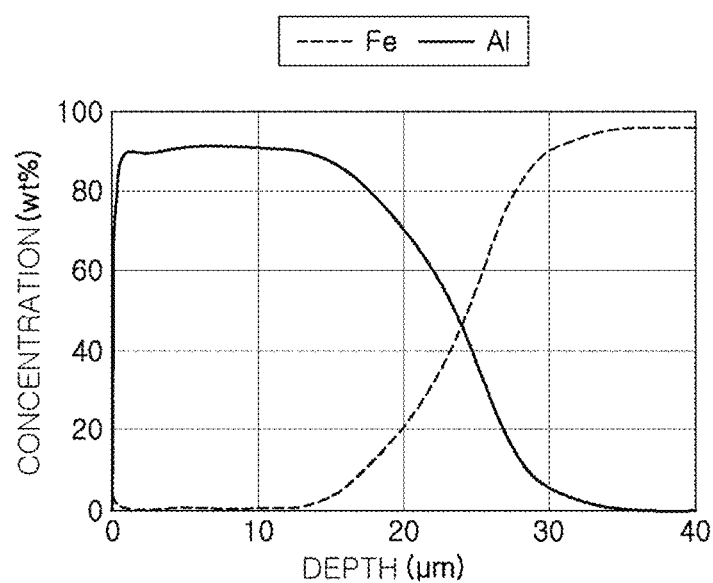
FIG. 8 is a composition profile obtained by analyzing a plated layer of a steel sheet manufactured according to Comparative Example 2 using a GDS analyzer.
Figure 9:
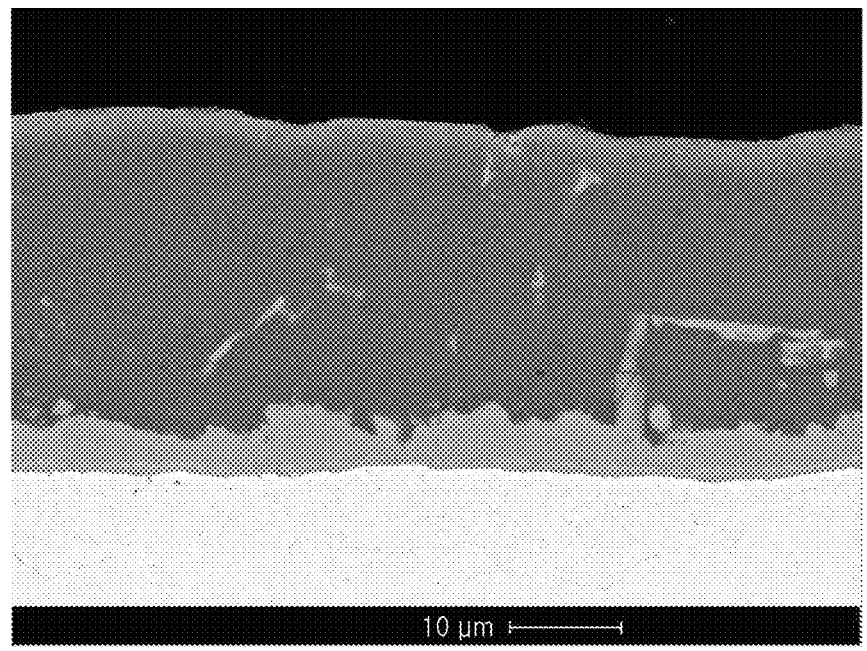
FIG. 9 is a scanning electron image of a cross-section of the plated layer of the steel sheet manufactured by Comparative Example 2 taken by a scanning electron microscope.

As a result of analyzing a plated layer of the steel sheet using a GDS analyzer, a composition profile of a form as shown in FIG. 8 was obtained, and an average Fe content calculated based on this was 21 wt %. As shown in FIG. 9, it can be confirmed that a cross-sectional form of the steel sheet had a plated layer formed on an outer surface of the base steel sheet, and almost no pores were formed in a portion corresponding to a surface layer portion from the surface of the formed plated layer to a point of 10 μm in the thickness direction thereof. An area ratio of the formed pores was 0%.

Comparative Example 3

A surface of the steel sheet having the composition shown in Table 1 above was plated with a type I plating bath having an Al-9% Si-2.5% Fe composition. During plating, a painting amount was adjusted to 90 g/m² per side, and a coil was wound by adjusting coiling tension after plating to 2 kg/mm².

The plated steel sheet was then heated to 650° C. under the following conditions in a batch annealing furnace.

An overall average temperature increase rate to 650° C.: 50° C./h

An average temperature increase rate in a temperature section of 400 to 500° C.: 10° C./h An average temperature increase rate in a temperature section of 600 to 650° C.: 70° C./h A temperature difference between an atmosphere and a coil at a heating temperature: 30° C.

After heating, the steel sheet was maintained at the same temperature for 10 hours, and the steel sheet was then cooled to an average cooling rate of 45° C./h to 500° C., and then cooled to an average cooling rate of 60° C./h to 100° C. to obtain a steel sheet for hot press forming.

Figure 10:
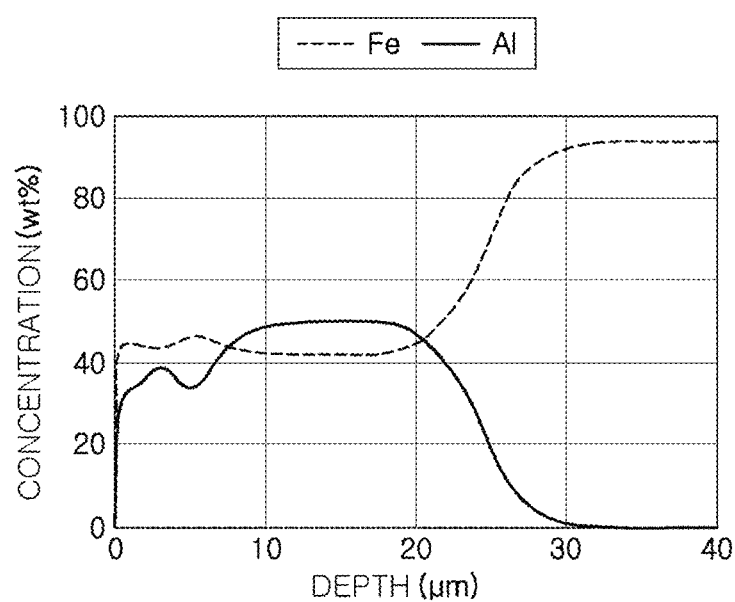
FIG. 10 is a composition profile obtained by analyzing a plated layer of a steel sheet manufactured according to Comparative Example 3 using a GDS analyzer.
Figure 11:
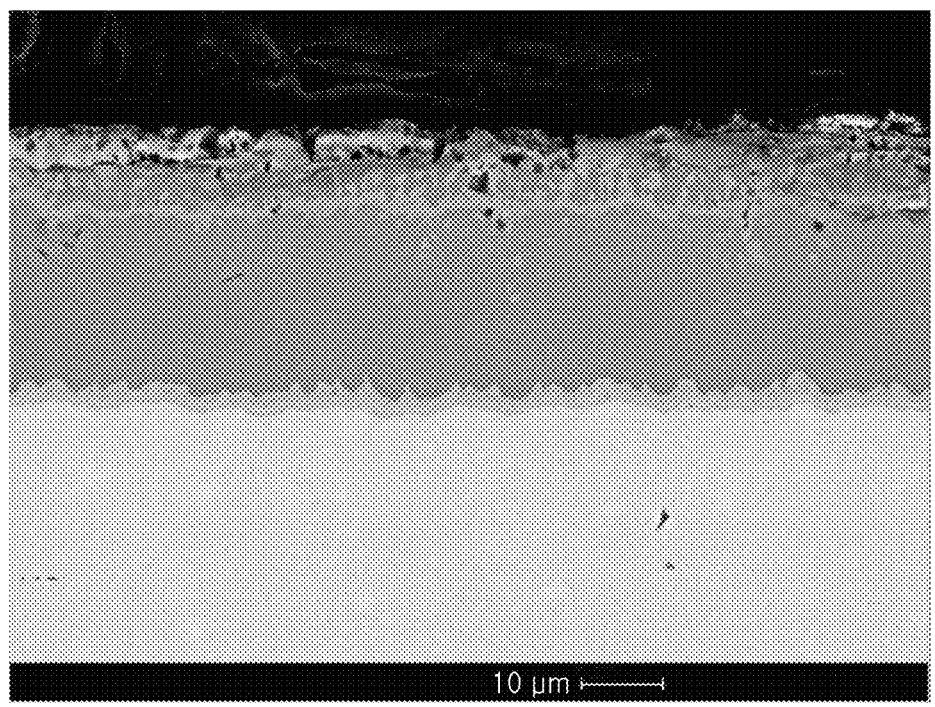
FIG. 11 is a scanning electron image of a cross-section of the plated layer of the steel sheet manufactured by Comparative Example 3 taken by a scanning electron microscope.

As a result of analyzing the plated layer of the steel sheet using a GDS analyzer, a composition profile having a form as shown in FIG. 10 could be obtained, and an average Fe content calculated based on this was 48.4 wt %. As shown in FIG. 11, a cross-sectional form of the steel sheet had a plated layer formed on an outer surface of the base steel sheet, and it can be confirmed that an area ratio of pores formed in a portion corresponding to a surface layer portion from the surface of the formed plated layer to a point of 10 μm in the thickness direction thereof was 3.5%.

Hot Press Forming

The steel sheets of Inventive Examples 1 and 2, and Comparative Examples 1 to 3 were heated to 950° C., and maintained at the above-described temperature for 5 minutes, and then subjected to hot press forming in which it was quenched while pressurized by a press to obtain a hot press formed member.

A cross-section of the obtained member was observed to observe the surface roughness Ra, and the results thereof were shown in Table 2 below.

TABLE 2

| Division | Surface roughness (Ra) |
|---|---|
| Inventive Example 1 | 2.01 |
| Inventive Example 2 | 2.23 |
| Comparative Example 1 | 1.12 |
| Comparative Example 2 | 1.27 |
| Comparative Example 3 | 1.48 |

As can be seen in Table 2, in Inventive Example 1 and Inventive Example 2, surface roughness (Ra) was 2.01 and 2.23 μm, respectively, and in Comparative Example 1, Comparative Example 2, and Comparative Example 3, a surface roughness (Ra) was only 1.12, 1.27, and 1.48 μm.

Phosphate treatment and electrodeposition painting were performed on the member obtained from each of Examples and Comparative Examples, and crosses were formed on the surface of the steel sheet, and then a cyclic corrosion test was performed to observe a degree of forming a blister on the crosses. The cyclic corrosion test was conducted for 24 hours with 1 cycle, 2 hours of wet atmosphere exposure-2 hours of salt water spray exposure-1 hour of drying-6 hours of wet atmosphere exposure-2 hours of drying-6 hours of wet atmosphere exposure-2 hours of drying-3 hours of cooling, and maintained a total of 50 cycles. In both Inventive Examples 1 and 2, a maximum width of the blister is 1 mm or less, while in Comparative Examples 1, 2, and 3, a maximum width of the blister is 3.2, 2.9, and 2.4 mm, respectively, and it could be confirmed that corrosion resistance after painting is inferior, compared to that of the Inventive Example.

Thus, advantageous effects of the present disclosure could be confirmed.

The invention claimed is:

1. A steel sheet for a hot press formed member having excellent painting adhesion and post-painting corrosion resistance, the steel sheet comprising:
   a base steel sheet; and
   an aluminum alloy plated layer formed on a surface of the base steel sheet,
   wherein a ratio of an area occupied by closed pores to an entire area of a surface layer portion is 10% or more, the surface layer portion being defined by a region within 10 μm depth from a surface of the aluminum alloy plated layer in a cross-section taken in a thickness direction of the aluminum alloy plate layer, and
   wherein an average content of Fe in the aluminum alloy plated layer is 30 wt % or more.

2. The steel sheet of claim 1, wherein the ratio is 15% or more.

3. The steel sheet claim 1, wherein the average content of Fe is 40 wt % or more.

4. The steel sheet of claim 1, wherein the base steel sheet has a composition including, by wt %, carbon (C): 0.04 to 0.5%, silicon (Si): 0.01 to 2%, manganese (Mn): 0.01 to 10%, aluminum(Al): 0.001 to 1.0%, phosphorus(P): 0.05% to 0.001%, sulfur (S): 0.02% to 0.0001%, nitrogen (N): 0.02% to 0.001%, and a balance of iron (Fe) and inevitable impurities.

5. The steel sheet of claim 4, wherein the composition of the base steel sheet further comprises, by wt %, one or more among a sum of one or more selected from the group consisting of Cr, Mo, and W: 0.01 to 4.0%, a sum of one or more selected from the group consisting of Ti, Nb, Zr, and V: 0.001 to 0.4%, Cu+Ni: 0.005 to 2.0%, Sb+Sn: 0.001 to 1.0%, and B: 0.0001 to 0.01%.

* * * * *